United States Patent [19]

McDonald et al.

[11] Patent Number: 4,973,670
[45] Date of Patent: Nov. 27, 1990

[54] METHOD FOR PREPARING HOLLOW LATEXES

[75] Inventors: Charles J. McDonald; Yohannes Chonde; William E. Cohrs, all of Midland, Mich.; Dalton C. MacWilliams, Alamo, Calif.

[73] Assignee: The Dow Chemical Company, Midland, Mich.

[21] Appl. No.: 441,006

[22] Filed: Nov. 22, 1989

Related U.S. Application Data

[63] Continuation-in-part of Ser. No. 231,793, Aug. 12, 1988.

[51] Int. Cl.$^5$ ............................................. C08J 9/28
[52] U.S. Cl. ...................................... 521/65; 521/69;
521/70; 521/71; 525/238; 525/239; 525/243;
428/402; 428/402.22; 428/407; 427/373
[58] Field of Search ............... 521/65, 69, 70, 71;
427/373; 428/402.22, 402, 407; 525/238, 239, 243

[56] References Cited

U.S. PATENT DOCUMENTS 4,468,498  8/1984  Kowalski et al. ................. 525/301
4,677,003  6/1987  Redlich et al. ..................... 427/373
4,798,691  1/1989  Kasai et al. ........................ 264/47

FOREIGN PATENT DOCUMENTS 020017  4/1986  Japan .

Primary Examiner—John Kight, III
Assistant Examiner—Sam A. Acquah

[57] ABSTRACT

The present invention provides for a process for preparing hollow polymer latexes by a one stage emulsion polymerization. The first step invloves introducing an effective amount of a first charge of a organic phase to an aqueous phase. The first charge of the organic phase comprises monomer which is vertually insoluble in the aqeuous phase and an inert-nonpolymerizable hydrocarbon. The polymer formed from polymerizing the monomer is virtually insoluble in the hydrocarbon, the hydrocarbon is virtually insoluble in the aqueous phase and the monomer is miscible with the hydrocarbon. The monomer is polymerized to produce a low molecular weight polymer such that the low molecular weight polymer will phase separate from the organic phase and conentrates at the surface of the introduced organic phase forming a low molecular weight polymer phase. The second step involves introducing a second charge of the organic phase to the aqeuous phase, wherein the second charge of the organic phase comprises a crosslinking monomer. The crosslinking monomer is polymerized with the low molecular weight polymer to produce a hollow polymer latex particle.

18 Claims, No Drawings

METHOD FOR PREPARING HOLLOW LATEXES

CROSS-REFERENCE TO RELATED APPLICATION

This application is a continuation-in-part of copending application Ser. No. 231,793, filed Aug. 12, 1988.

BACKGROUND OF THE INVENTION

Hollow particles are useful as opacifying agents in coating applications such as in paint or paper-coating. The use of the hollow latex in such coatings reduces the need for expensive pigments, such as $TiO_2$, without adding excessive and undesirable weight to the coating. The hollow latex particle provides opacity because the hollow structure in a latex particle scatters light more efficiently than a corresponding particle of uniform density. The light scattering properties are related to the difference in refractive index between the shell and the internal void. Such hollow latexes have additional utility in areas other than coatings such as in processes involving microencapsulations to prepare for example, control release agents.

SUMMARY OF THE INVENTION

Accordingly, the present invention is an efficient process for the preparation of hollow latex particles. The process comprises preparing hollow latex polymers by a single stage emulsion polymerization of monomers in the presence of hydrocarbons, by:

(1) introducing to a polymerization vessel an initial reactor charge which comprises: a first organic phase and an aqueous phase: the aqueous phase comprising water and an effective amount of water-soluble initiator; the organic phase comprising: (a) an effective amount of at least one monomer, having a solubility of less than about three percent in the aqueous phase under polymerization conditions and (b) an effective amount of an inert-nonpolymerizable hydrocarbon wherein the polymer formed from polymerizing the monomer is less than about three percent soluble in the hydrocarbon under polymerization conditions and wherein the hydrocarbon has less than about one percent solubility in the aqueous phase under polymerization conditions and wherein the monomer is miscible with the hydrocarbon under polymerization conditions: and (2) polymerizing the monomer under conditions to produce a low molecular weight polymer such that when the low molecular weight polymer reaches a molecular weight sufficient to cause the low molecular weight polymer to phase separate from the initial organic phase, the low molecular weight polymer phase separates from the organic phase and concentrates at the surface of the organic phase forming a low molecular weight polymer phase: and (3) introducing to the vessel a second reactor charge comprising a second charge of organic phase to the aqueous phase when the low molecular weight polymer reaches a conversion of monomer to polymer of equal to or less than about 80 weight percent, wherein the second charge of organic phase additionally comprises a crosslinking monomer wherein the crosslinking monomer becomes imbibed in the low molecular weight polymer phase: and (4) polymerizing the crosslinking monomer with the low molecular weight polymer under polymerization conditions sufficient to produce a hollow polymer latex particle.

DETAILED DESCRIPTION OF THE INVENTION

"Hollow polymer latex particles", as used herein, is meant to include latex particles which are not completely solid. Such particle morphology can include various void structures such as uniform microvoids or hemispherical particles with voided centers. The more preferred hollow polymer latex particles are those having a centered void and a particle wall thickness aspect ratio of inner diameter to outer diameter of from about $0.1\mu m$ to about $0.9\mu m$. The hollow polymer latex particles having a centered void have greater utility in coatings than those structures having microvoids or hemispherical particles with voided centers.

The term "aqueous phase" as used herein is meant to define a medium for the organic phase. The aqueous phase typically comprises water, an effective amount of chain transfer agent and an effective amount of water-soluble initiator. Optionally, the aqueous phase can contain surfactant(s) and/or seed particles. The water is typically present in an amount of from about 100 to about 65 weight percent based on the total weight of the aqueous phase.

The "water-soluble initiators" suitably employable in the aqueous phase are those typically known in the art, for example redox pairs including sodium bisulfite and sodium persulfate: ferrous ions and a peroxide (Fenton's reagent); cuprous ions and peroxide; and ferrous ions and sodium persulfate wherein the peroxides can include benzoyl peroxide, hydrogen peroxide, or t-butyl peroxide. These initiators can be combined with thermal initiators that are not water-soluble, such as higher alkyl peroxides or azo compounds or thermal initiators which are water-soluble such as persulfate. Examples of water-insoluble thermal initiators are azobisisobutyronitrile and t-butylperoctoate.

The effective amount of initiator can be from about 0.1 to about equal to or less than about 2 weight percent based on the weight of the total polymer. Preferably, the effective amount of initiator is from about 0.4 to about 1.0 weight percent based on the total weight of the polymer.

The "chain transfer agent" is typically any polymerization component typically known in the art as a chain transfer agent such as aliphatic alcohols, for example methanol or isopropyl alcohol: carbon tetrachloride: the mercaptans such as tertiary dodecyl mercaptan: and any other water-soluble or hydrocarbon soluble material capable of controlling the molecular weight of polymers. To optimize the process of the present invention, the rate of polymerization as well as the molecular weight of the polymer are important for the hollow particle formation. The molecular weight of the polymer can be controlled by initiator concentration and/or chain transfer agent. The rate of polymerization is controlled by initiator type, level and temperature. If the initiators are chosen to optimize the molecular weight of the latex polymer particle, a chain transfer agent may not be necessary.

An effective amount of chain transfer agent is that amount which contributes to the low molecular weight polymer reaching a molecular weight sufficient to cause the low molecular weight polymer to phase separate from the first introduced organic phase forming the low molecular weight polymer phase.

Typically, an effective and qualitative amount of any chain transfer agent will be from about 0.1 to about 50 weight percent based on total weight of the polymer. Some chain transfer agents are known in the art to be more efficient than other chain transfer agents. More efficient chain transfer agents are effective at lesser concentrations. Mercaptans are an example of a more efficient chain transfer agent. An effective amount of a more efficient chain transfer agent will be from about 0.1 to about 1.0 weight percent based on total weight of the polymer. Most preferably an effective amount of a more efficient chain transfer agent will be from about 0.1 to about 0.5 weight percent based on total weight of the polymer.

For lesser efficient chain transfer agents, such as aliphatic alcohols, a higher concentration than the more efficient chain transfer is necessary to effect the same degree of chain transfer as the more efficient chain transfer agent at a lesser concentration. An effective amount for lesser efficient chain transfer agents will be from about 1 to about 65 weight percent based on total weight of aqueous phase. Most preferably, an effective amount of a lesser efficient chain transfer agent will be from about 20 to about 35 weight percent based on total weight of aqueous phase.

Aliphatic alcohols, for example methanol, are thought to contribute to the control of the molecular weight of the polymer formed and also to interact with the initiator system, sodium persulfate, to slow down the rate of polymerization. Further, the interfacial tension between the aqueous and organic phase is influenced by the alcohol.

"Surfactants" as used herein includes those conventional surface active agents typically known in the art for polymerization processes. Typically, the surfactant(s) is added to the aqueous phase. An effective amount of surfactant in a seeded process is that amount selected to assist in stabilizing the particle as a colloid, minimizing contact between the particles and preventing coagulation. In an unseeded process an effective amount of surfactant will be that amount selected to influence the particle size. The type of surfactant and concentration of surfactant will also be chosen with regard to the polymer solids level of the process. A higher polymer solids level will increase the need for surfactant.

Typical surfactants will include, alkylated diphenyl oxide disulfonates, sodium dodecyl benzene sulfonates and dihexyl esters of sodium sulfosuccinic acid.

Preparing the hollow latex polymer particle via a seeded process is conducted similarly to that process without the seed. However, a seed is used which will have a particle size of from about 0.02μm to about 0.10μm. The concentration of the seed is determined by the size of the final hollow polymer latex particle desired. The preferred size of the hollow polymer latex particle for optimizing the opacity of the latex in a coating is between 0.4μm and 0.5μm.

Typically, the seed particle exists as an aqueous dispersion and is introduced to the polymerization process in the aqueous phase at a concentration of about equal to or less than 2 weight percent of the total monomer present, preferably, less than 1 weight percent. The polymer composition of the seed particle can be either similar to or dissimilar to the polymer composition of the resultant hollow latex polymer and there are no restrictions to the molecular weight of the seed polymer.

The term "organic phase" as used herein defines two charges of a phase of the polymerization which comprises an effective amount of at least one monomer having a solubility of less than about three percent in the aqueous phase under polymerization conditions and an effective amount of an inert-nonpolymerizable hydrocarbon, wherein the polymer formed from polymerizing the monomer is less than about three percent soluble in the hydrocarbon under polymerization conditions. Also, the hydrocarbon should be less than about one percent soluble in the aqueous phase under polymerization conditions. Additionally, the monomer and the hydrocarbon should be miscible with each other under polymerization conditions.

"Polymerization conditions" is defined herein to mean conditions wherein the temperature is between 25° C. and 95° C. in a pressurized jacketed reactor wherein each component (eg. monomer, water, hydrocarbon) of the polymerization process is at polymerization concentrations. The pressure of the reactor is primarily determined by the vapor pressure, at reaction temperature, of the monomer and hydrocarbon chosen.

"Solubility" as used herein means that the substance defined as soluble is, under polymerization conditions, solubilized in the solubilizing medium and results in a mixture which is transparent (i.e., clear) or at least translucent. Further, "solubility" as used herein, is defined to mean that the substance defined as soluble is to be distinguished from a different substance which when added to the same solubilizing medium under similar conditions, is merely dispersible in the solubilizing medium wherein the dispersion is characterized by a white, milky appearance.

"Miscibility" as used herein means the substance defined as miscible is, under polymerization conditions, solubilized in the solubilizing medium and results in a mixture which is transparent (i.e., clear) or at least translucent. Further, "miscibility" as used herein, is defined to mean that the substance defined as miscible is to be distinguished from a different substance which when added to the same solubilizing medium under similar conditions, is merely dispersible in the solubilizing medium wherein the dispersion is characterized by a white, milky appearance.

The term "initial or first charge of the organic phase" as used herein defines a first addition of the organic phase to the aqueous phase. Similarly, the term "second or additional charge of the organic phase" as used herein defines a second addition of organic phase to the aqueous phase.

The "second charge of the organic phase" is also meant to include crosslinking monomer and optionally additional monomer(s) and hydrocarbon(s).

The term "hydrocarbon" is meant to include inert nonpolymerizable hydrocarbons having solubilities of less than about one percent in the aqueous phase of the present process to prepare the hollow latex. The particular hydrocarbon used depends on the monomer chosen. The hydrocarbon should be completely miscible with the monomer. Examples of suitably employed hydrocarbon(s) can include hexane, heptane, isooctane, nonane, decane, or higher alkyl chain hydrocarbons and mixtures of such hydrocarbons.

Typically the hydrocarbon of the first charge of the organic phase is present in an amount of from about 50 to about 3 weight percent based on total weight of the first charge of the organic phase.

The term "crosslinking monomer" is meant to include monomers conventionally known in the art as useful for crosslinking polymerizable monomers. Examples of such monomers typically include di- or tri-functional monomers such as divinyl benzene, ethylene glycol dimethacrylate, 1,3-butylene glycol dimethacrylate, trimethylol propane trimethacrylate, allyl methacrylate or diene functional monomers such as butadiene. The crosslinking monomer can be present in the second charge of the organic phase in an amount of from about 100 to about 4 weight percent based on the total weight of the second charge of the organic phase.

The monomers and mixtures of monomers which are suitably employed in the present invention include monovinyl aromatic monomers, aliphatic conjugated diene monomers, acrylate monomers, vinylidene halide or vinyl halide monomers, vinyl esters of carboxyl acids containing from 1 to 18 carbon atoms, such as vinyl acetate or vinyl stearate, methacrylonitrile and acrylonitrile. A monoethylenically unsaturated carboxylic acid monomer could also be used.

The term "monovinyl aromatic monomer", as used herein, is meant to include those monomers with a radical of the formula

(wherein R is hydrogen or a lower alkyl such as an alkyl having from 1 to 4 carbon atoms) attached directly to an aromatic nucleus containing from 6 to 10 carbon atoms, including those wherein the aromatic nucleus is substituted with alkyl or halogen substituents. Examples include styrene, alpha methyl styrene, p-methyl styrene, t-butyl styrene, vinyltoluene, and halogenated styrene. The preferred monomer is styrene.

Typically the amount of monovinyl aromatic monomer present in the first charge of the organic phase will depend on the monomer chosen, however, the typical range will be from about 0 to about 97 weight percent based on the total weight of the first charge of the organic phase. The amount of monovinyl aromatic monomer present in the second charge of the organic phase will depend on monomer chosen, and the amount of crosslinking required in the resulting polymer however, the typical range will be from about 0 to about 97 weight percent based on the total weight of the second charge of the organic phase.

The term "aliphatic conjugated diene", as used herein, is meant to include monomer compounds such as isoprene, 1,3-butadiene, 2-methyl-1,3-butadiene, piperylene (1,3-pentadiene), and other hydrocarbon analogs of 1,3-butadiene. Typically the amount of aliphatic conjugated diene monomer present in the first charge of the organic phase will depend on monomer chosen, however, the typical range will be from about 0 to about 50 weight percent based on the total weight of the first charge of the organic phase. The amount of aliphatic conjugated diene monomer present in the second charge of the organic phase will depend on monomer chosen, and the amount of crosslinking required in the resulting polymer however, the typical range will be from about 0 to about 100 weight percent based on the total weight of the second charge of the organic phase.

"Vinylidene halide" and "vinyl halide monomers" suitable for this invention include vinylidene chloride and vinyl chloride, which are highly preferred. Vinylidene bromides and vinyl bromide can also be employed.

Typically the amount of vinylidene halides and vinyl halides present in the initial or first charge of the organic phase will depend on monomer chosen, however, the typical range will be from about 0 to about 97 weight percent based on the total weight of the first charge of the organic phase. The amount of vinylidene halides and vinyl halides present in the second charge of the organic phase will depend on monomer chosen, and the amount of crosslinking required in the resulting polymer however, the typical range will be from about 0 to about 97 weight percent based on the total weight of the second charge of the organic phase.

The term "acrylate", as used herein, is meant to include the monovinyl acrylate or methacrylate monomers in the first charge of the organic phase. Monovinyl or divinyl acrylates can be used in the second charge of the organic phase. Additionally, the monovinyl or divinyl acrylates can include acids, esters, amides, and substituted derivatives thereof. Generally, the preferred monovinyl acrylates are $C_1$-$C_8$ alkyl acrylates or methacrylates. Examples of such acrylates include butyl acrylate, hexyl acrylate, 2-ethyl hexyl acrylate, tert-butyl acrylate, methylmethacrylate, butylmethacrylate, ethyl methacrylate, hexylmethacrylate, isobutylmethacrylate, and isopropylmethacrylate. The preferred monovinyl acrylates are butyl acrylate and methylmethacrylate.

Typically the amount of acrylate present in the first charge of the organic phase will depend on monomer chosen, however, the typical range will be from about 0 to about 97 weight percent based on the total weight of the first charge of the organic phase. The amount of acrylate present in the second charge of the organic phase will depend on monomer chosen, and the amount of crosslinking required in the resulting polymer. The typical range of acrylate present in the second charge of the organic phase will be from about 0 to about 97 weight percent based on the total weight of the second charge of the organic phase.

The term "monoethylenically unsaturated carboxylic acid monomer", as used herein, is meant to include those monocarboxylic monomers such as acrylic acid, and methacrylic acid: dicarboxylic monomers such as itaconic acid, fumaric acid, maleic acid, and their monoesters.

Typically the amount of monoethylenically unsaturated carboxylic acid monomer present in the first charge of the organic phase is that amount necessary to stabilize the latex particle. A typical example of such an amount is from about 2 to about 10 weight percent based on the total weight of the first charge of the organic phase.

The term "low molecular weight polymer" as used herein is meant to include polymers of the monomers of the first stage which are lower in molecular weight than the polymer of the resulting latex particle but sufficient in molecular weight to enable the polymer to begin precipitating from the organic phase and begin dynamically phase separating from the organic phase to form the low molecular weight polymer phase. Typically the low molecular weight polymer will have a number average molecular weight of from about 10,000 to about 100,000.

The "low molecular weight polymer phase" is defined as primarily comprising concentrated low molecular weight polymer and unreacted monomer at the interface of the aqueous phase and the first charge of the organic phase.

The temperature range of the polymerization process, whether a seeded or unseeded process, will depend upon the initiators chosen and is typically in a range of from about 50° C. to about 95° C. A typical temperature for the initiation of the polymerization using persulfate initiators is from about 60° C. to about 90° C.

THE PROCESS OF THE PRESENT INVENTION

The process for preparing the present hollow latex involves two organic charges in a signal stage emulsion polymerization wherein either charge can be continuous addition or batch addition. The monomers of the first charge are polymerized in an aqueous medium that contains a chain transfer agent and a hydrocarbon, the hydrocarbon being miscible with the monomer under polymerization conditions but less than about one percent soluble in the aqueous phase under polymerization conditions. The second charge can be started at almost anytime during the polymerization and involves adding the second charge of the organic phase which contains crosslinking monomer and optionally more monomer and hydrocarbon. Preferably, the second charge begins when the monomer begins polymerizing forming the low molecular weight polymer. More preferably, the second charge is begun after the low molecular weight polymer begins to phase separate from the first charge of the organic phase and concentrates at the surface of the forming particle.

Quantitatively, the second charge of the organic phase can be added when the low molecular weight polymer reaches a conversion of monomer to polymer of equal to or less than about 80 percent. Preferably, the second charge of the organic phase can be added when the first charge monomer to polymer conversion reaches from about 2 to about 80 percent. More preferably, the second charge of the organic phase can be added at from about 10 to about 40 percent conversion of first charge monomer to polymer.

As the polymerization occurs, the low molecular weight polymer phase separates from the hydrocarbon because of the polymer's insolubility in the organic phase under polymerization conditions. Upon further polymerization of monomer, the polymer is readily concentrated at the aqueous surface of the particle and away from the hydrocarbon monomer phase thus forming a latex having a morphology with a hollow core and a polymer shell or variations of a hollow morphology within the latex polymer.

An aqueous phase is added which is first made up of water, an effective amount of water-soluble chain transfer agent and an effective amount of water-soluble initiator. Optionally, the surfactant(s) and/or seed particles can be components of the aqueous phase. Introduced to the aqueous phase is a first charge of the organic phase which comprises at least one monomer and an effective amount of an inert-nonpolymerizable hydrocarbon. The monomer(s) should have a solubility of less than about three percent in the aqueous phase under polymerization conditions. The hydrocarbon should have less than about one percent solubility in the aqueous phase and should be miscible with the monomer under polymerization conditions. The polymer formed from polymerizing the monomer should be less than about three percent soluble in the hydrocarbon under polymerization conditions. The monomer(s) is then polymerized under conditions which produce a low molecular weight polymer phase. Such conditions include chain transfer agent, initiators, temperature and monomer chosen to produce a low molecular weight polymer having a number average molecular weight of from about 10,000 to about 100,000.

Once the low molecular weight polymer reaches a sufficient molecular weight, the low molecular weight polymer will phase separate from the first introduced organic phase and concentrate at the surface of the introduced organic phase forming a low molecular weight polymer phase.

When the low molecular weight polymer reaches a conversion of monomer to polymer of equal to or less than about 80 percent monomer to polymer, a second charge is added. The second charge of the organic phase comprises a crosslinking monomer and optionally other monomer and additional hydrocarbon. The monomer(s) becomes preferentially imbibed in the low molecular weight polymer phase and is polymerized within the low molecular weight polymer under polymerization conditions sufficient to produce a hollow polymer latex particle. Such polymerization conditions are those typically known in polymerization processes and are known to be dependent on polymerization parameters such as the polymerization temperatures and the reactor pressure which are dependent upon the concentrations and types of polymerization components chosen.

OPACITY

The opacifying characteristics of the latexes can be determined by blending the hollow latex with a styrene/butadiene film forming latex binder in a 30/70 sample/ binder weight ratio. The latex mixture is drawn down on a clean mylar sheet using a #30 Meyer rod and is oven dried for 1 minute at 100° C. The opacity of the film is then measured using a Diano Corporation BNL-2 Opacimeter. The opacimeter measures TAPPI Opacity which is defined as the ratio of light reflected from a paper sample when the sample is backed by a perfectly black body to that when the sample is backed by a white body of 89 percent reflectance. Refraction at the air/polymer interface between the void and the particle shell is the primary source of scattered light or opacity. The thinner the shell, the more scattering sites that exist per unit mass of polymer.

The following examples are illustrative embodiments of the present invention and are not meant to narrow the scope of the process of the invention.

EXAMPLE 1

Into a 1-gallon stainless steel jacketed reactor is charged 379 grams of methanol, 943 grams of water, 3.9 grams of sodium persulfate, 4 grams of an alkylated diphenyl oxide disulfonate surfactant and 0.96 grams of seed which will yield a particle having a particle size of about 0.4000 μm. To this mixture is charged 225 grams of styrene, 37.1 grams of methacrylic acid, and 115 grams of isooctane. The resulting mixture is agitated and heated. After about 1 hour, the second monomer charge is con-added to the mixture. The second monomer charge comprises 385 grams of styrene, 53 grams of divinylbenzene at 80 percent vinyl concentration and 68 grams of isooctane. The resulting mixture is agitated and heated until the reaction is complete. The polymer particles are examined by transmission electron microscopy and hydrodynamic chromatography. The polymer particles are hollow having an internal diameter of 0.1500μm–0.2000μm and a mean overall diameter of about 0.4000 μm. The hydrocarbons are removed by stripping and the stripped polymer maintains the same structure as the unstripped polymer.

The opacity of the latex is determined as follows. 30 weight percent of the latex from Example 1 is blended with 70 weight percent of a film-forming binder latex such as a styrene-butadiene latex. The latex blend is film-drawn on a clean mylar sheet using a number 30 Meyer rod and is oven dried for one minute at 100° C. The opacity of the film is measured using a Diano Corporation NBNL-2 Opacimeter. The opacimeter measures TAPPI opacity which is defined as the ratio of light reflected from a paper sample when the paper is backed by a perfectly black body to that when the paper sample is backed by a white body of 89 percent reflectance. The readings of opacity for Example 1 are within the range between 33 and 38. A comparative example of uniform density polymer particles having similar diameter to the hollow polymer particle is prepared and the opacity readings are between 10 and 14. The difference between the opacity readings of the hollow polymer particle and the uniform density polymer particle illustrates the greater degree of light scattered by the hollow polymer particle over the uniform density polymer particle.

EXAMPLE 2

The second example is conducted similarly to the Example 1 but the hydrocarbon is heptane rather than isooctane. The concentrations and results being the same or similar. The opacity readings as performed as in Example 1 are between 33 and 38.

EXAMPLE 3

Into a 1-gallon stainless steel jacketed reactor is charged 488 grams of methanol, 1013 grams of water, and 2.3 grams of sodium persulfate. To this mixture is charged 174 grams of styrene, 23.4 grams of acrylic acid, and 54 grams of isooctane. The resulting mixture is agitated and heated under nitrogen. After about 3 hours of agitation and heating at about 70° C., the second monomer charge is con-added to the mixture. The second monomer charge comprises 174 grams of styrene, 29.8 grams of divinylbenzene at 80 percent vinyl content and 54 grams of isooctane. The resulting mixture is agitated and heated until the reaction is complete. The polymer particles are examined by transmission electron microscopy and hydrodynamic chromatography. The polymer particles are hollow having an overall diameter of about 0.5500μm and an internal diameter of about 0.1700μm. The hydrocarbons are removed by stripping and the stripped polymer maintains the same structure as the unstripped polymer. The opacity readings are obtained similarly to those in Example 1 and are between 33 and 38.

EXAMPLE 4

Into a 1-gallon stainless steel jacketed reactor is charged 488 grams of methanol, 1013 grams of water, and 2.24 grams of sodium persulfate. To this mixture is charged 174 grams of styrene, 22.4 grams of acrylic acid, and 54 grams of isooctane. The resulting mixture is agitated and heated under nitrogen. After about 3 hours of agitation and heating at about 70° C., the second monomer charge is con-added to the mixture. The second monomer charge comprises 87 grams of styrene, 87 grams of methyl methacrylate, 30.0 grams of divinylbenzene at 80 percent vinyl content and 54 grams of isooctane. The resulting mixture is agitated and heated until the reaction is complete. The polymer particles are examined by transmission electron microscopy and hydrodynamic chromatography. The polymer particles are hollow having an overall diameter of 0.5000μm and an internal diameter of about 0.1500μm–0.2000μm. The hydrocarbons are removed by stripping and the stripped polymer maintains the same structure as the unstripped polymer. The opacity readings are obtained similarly to those of Example 1 and are between 33 and 38.

EXAMPLE 5

The latex particle is prepared as in Example 1 except that 0.3 grams of tertiary-dodecyl mercaptan is added to the batch charge of monomer, which is the first charge of monomer. The opacity data is obtained similarly to the procedure described in Example 1 and the opacity value is about 45.

EXAMPLE 6

Into a 1-gallon stainless steel jacketed reactor is charged 593 grams of methanol, 1544 grams of water, and 3.4 grams of sodium persulfate, 8 grams of an alkylated diphenyl oxide disulfonate surfactant and 0.96 grams of seed which will yield a resultant polymer particle having a particle size of about 0.400μm. To this mixture is charged 96.6 grams of styrene, 96.6 grams of methylmethacrylate, 31.8 grams of methacrylic acid, 98.4 grams of isooctane and 1.8 grams of an efficient chain transfer agent. The resulting mixture is agitated and heated under nitrogen. After about 1 hour of agitation and heating at about 70° C., the second monomer charge is con-added to the mixture. The second monomer charge comprises 330 grams of methyl methacrylate, 52 grams of allyl methacrylate and 68 grams of isooctane. The resulting mixture is agitated and heated until the reaction is complete. The polymer particles are examined by transmission electron microscopy and hydrodynamic chromatography. The polymer particles are hollow having an overall diameter of about 0.4000μm and an internal diameter of about 0.1700μm. The hydrocarbons are removed by stripping and the stripped polymer maintains the same structure as the unstripped polymer. The opacity readings are obtained similarly to those in Example 1 and are between 33 and 38.

What is claimed is:

1. A process which comprises preparing hollow latex polymers by a single stage emulsion polymerization of monomers in the presence of hydrocarbons, by:
   (1) introducing to a polymerization vessel an initial reactor charge which comprises: an organic phase and an aqueous phase: the aqueous phase comprising water and an effective amount of water-soluble initiator: the organic phase comprising: (a) an effective amount of at least one monomer, having a solubility of less than about three percent in the aqueous phase under polymerization conditions and (b) an effective amount of an inert-nonpolymerizable hydrocarbon wherein the polymer formed from polymerizing the monomer is less than about three percent soluble in the hydrocarbon under polymerization conditions and wherein the hydrocarbon has less than about one percent solubility in the aqueous phase under polymerization conditions and wherein the monomer is miscible with the hydrocarbon under polymerization conditions; and (2) polymerizing the monomer under conditions to produce a low molecular weight polymer such that when the low molecular weight polymer reaches a molecular weight sufficient to cause the low molecular weight polymer to phase separate from the first introduced organic phase, the low molecular weight polymer phase separates from the introduced organic phase and concentrates at the surface of the introduced organic phase forming a low molecular weight polymer phase: and (3) introducing to the vessel a second reactor charge comprising an additional effective amount of the organic phase to the aqueous phase when the low molecular weight polymer reaches a conversion of monomer to polymer of equal to or less than about 80 weight percent, wherein the second charge of the organic phase additionally comprises a crosslinking monomer wherein the crosslinking monomer becomes imbibed in the low molecular weight polymer phase; and (4) polymerizing the crosslinking monomer with the low molecular weight polymer under polymerization conditions sufficient to produce a hollow polymer latex particle.

2. The process of claim 1 wherein the aqueous phase additionally comprises an effective amount of chain transfer agent.

3. The process of claim 2 wherein the chain transfer agent is present in an amount of from about 0.1 to about 50 weight percent based on the total weight of the polymer.

4. The process of claim 1 wherein the water-soluble initiator is present in an amount of from about 0.4 to about 1.0 weight percent based on the total weight of the polymer.

5. The process of claim 1 wherein the monomer of the first charge of the organic phase is selected from the group consisting of: monovinyl aromatic monomers; aliphatic conjugated diene monomers; acrylate monomers; vinylidene halide and vinyl halide monomers; vinyl ester monomers of carboxyl acids containing from 1 to 18 carbon atoms: methacrylonitrile; acrylonitrile: and monoethylenically unsaturated carboxylic acid monomer.

6. The process of claim 2 wherein the second charge of the organic phase further comprises monomer selected from the group consisting of: monovinyl aromatic monomers: acrylate monomers: aliphatic conjugated diene monomers; vinylidene halide and vinyl halide monomers; vinyl ester monomers of carboxyl acids containing from 1 to 18 carbon atoms: methacrylonitrile; acrylonitrile: and monoethylenically unsaturated carboxylic acid monomer.

7. The process of claim 6 wherein the low molecular weight polymer of the low molecular weight polymer phase has an average number molecular weight of from about 1,000 to about 100,000.

8. The process of claim 6 wherein the second charge of the organic phase further comprises hydrocarbon.

9. The process of claim 1 wherein the chain transfer agent is an aliphatic alcohol and wherein the aliphatic alcohol is present in the aqueous phase in an amount of from about 2 to about 65 weight percent based on the total weight of the aqueous phase, the initiator is present in an amount of less than or equal to about 2 weight percent based on the total weight of the polymer and the water is present in an amount of from about 98 to about 35 weight percent based on the total weight of the aqueous phase.

10. The process of claim 1 wherein the monomer of the first hydrocarbon is a blend of a monovinyl aromatic monomer and a monoethylenically unsaturated carboxylic acid monomer.

11. The process of claim 10 wherein the monovinyl aromatic monomer is present in an amount of from about 0 to about 97 weight percent and the monoethylenically unsaturated carboxylic acid monomer is present in an amount of from about 2 to about 10 weight percent based on the total weight of the first charge of the organic phase.

12. The process of claim 8 wherein the monomer of the second charge of the organic phase is a monovinyl aromatic monomer and the crosslinking monomer is divinyl benzene.

13. The process of claim 12 wherein the monomer of the second charge of the organic phase is a blend of the monovinyl aromatic monomer and an aliphatic conjugated diene monomer.

14. The process of claim 12 wherein the monovinyl aromatic monomer is present in an amount of from about 0 to about 97 weight percent and the divinyl benzene is present in an amount of from about 4 to about 100 weight percent based on the total weight of second charge of the organic phase.

15. The process of claim 8 wherein the aqueous phase additionally comprises surfactant.

16. The process of claim 12 wherein the aqueous phase additionally comprises surfactant.

17. The process of claim 15 wherein the aqueous phase additionally comprises a seed.

18. The process of claim 17 wherein the polymer composition of the seed is similar to the polymer composition of the resultant hollow polymer latex particle and the seed is present in the aqueous phase at a concentration of equal to or less than about 2 weight percent based on total monomer.

* * * * *